United States Patent
Habetha et al.

(10) Patent No.: US 7,684,428 B2
(45) Date of Patent: Mar. 23, 2010

(54) SYSTEM AND METHOD TO FREE UNUSED TIME-SLOTS IN A DISTRIBUTED MAC PROTOCOL

(75) Inventors: Joerg Habetha, Aachen (DE); Javier Del Prado Pavon, Ossining, NY (US)

(73) Assignee: Koninklijke Philips Electronics NV, Eindhoven (NL)

( * ) Notice: Subject to any disclaimer, the term of this patent is extended or adjusted under 35 U.S.C. 154(b) by 345 days.

(21) Appl. No.: 11/572,684

(22) PCT Filed: Jul. 25, 2005

(86) PCT No.: PCT/IB2005/052494
§ 371 (c)(1),
(2), (4) Date: Jan. 25, 2007

(87) PCT Pub. No.: WO2006/013531
PCT Pub. Date: Feb. 9, 2006

(65) Prior Publication Data
US 2007/0263567 A1     Nov. 15, 2007

Related U.S. Application Data

(60) Provisional application No. 60/591,401, filed on Jul. 27, 2004, provisional application No. 60/628,684, filed on Nov. 17, 2004.

(51) Int. Cl.
*H04L 12/56* (2006.01)
(52) U.S. Cl. ..................... 370/443; 370/458
(58) Field of Classification Search ............... None
See application file for complete search history.

(56) References Cited

U.S. PATENT DOCUMENTS

| | | | |
|---|---|---|---|
| 6,246,702 B1 * | 6/2001 | Fellman et al. | 370/503 |
| 2001/0038620 A1 * | 11/2001 | Stanwood et al. | 370/336 |
| 2002/0071413 A1 * | 6/2002 | Choi | 370/337 |

OTHER PUBLICATIONS

Part 15.3: Wireless Medium Access Control (MAC) and Physical Layer (PHY) Specifications for High Rate Wireless Personal Area Networks (WPANs) IEEE STD 802.15.3-2003, pp. 1-315. XP002342619.

* cited by examiner

*Primary Examiner*—Huy D Vu
*Assistant Examiner*—Benjamin Lamont
(74) *Attorney, Agent, or Firm*—Larry Liberchuk

(57) ABSTRACT

The system and method of the present invention provide a protocol for a device (400) to announce that a previously reserved time-period or time-slot is not (completely) used and becomes available, so that other devices can transmit during the unused time. The system and method are especially intended for systems with distributed medium reservation by the devices, i.e., those systems adhering to a distributed reservation protocol (DRP).

21 Claims, 3 Drawing Sheets

SYSTEM AND METHOD TO FREE UNUSED TIME-SLOTS IN A DISTRIBUTED MAC PROTOCOL

The present invention relates to freeing of unused reserved in a time-slot of a distributed MAC protocol for wireless networks.

Multimedia transmission over wireless networks is becoming more prevalent because of an increasing market demand. The constituent parts of current wireless communication protocols include a physical layer and a MAC. The Multi-Band OFDM Alliance (MBOA) is currently standardizing a new MAC protocol for UWB. This MAC protocol is currently available as draft version 0., see *MBOA Specification, MBOA Wireless Medium Access Control (MAC) for High Rate Personal Area Networks (WPANS) specification, draft* 0.5, Mar. 23, 2004, the entire contents of which are hereby incorporated by reference as if fully set forth herein. The MAC protocol is a distributed protocol for access to the shared medium. A short description of the protocol is provided in the following.

Wireless personal area networks (WPANs) cannot provide the network infrastructure of a typical wireless local area network (WLAN). The distributed MAC protocol eliminates the need for a network infrastructure by distributing functions across all devices, e.g., nodes. There is no access point or central coordinator for a wireless personal area network (WPAN). That is, all devices in a WPAN exhibit the same protocol behavior and have the same hardware/software capabilities. Asynchronous and isochronous data transfers are supported. Isochronous transfer is supported by means of bandwidth reservation, which is handled in a fully distributed manner.

All devices announce their airtime utilization via beacon transmission, recognize neighboring devices' airtime utilization by receiving beacons from them, and respect other devices' airtime utilization prior to transmitting/receiving data. This makes the distributed MAC protocol very well suited for ad-hoc applications and peer-to-peer networking. Furthermore, the reservation of the medium by the devices on which the distributed MAC is based eliminates sensing and collision times on the medium.

To maintain coordination between communicating devices, all devices are required to regularly transmit a beacon 105. Beacon 105 provides the basic timing for the network and transmits information regarding the isochronous reservations. The basic timing structure is a superframe of length 65,536 [usec]. The superframe 100 is composed of 256 Media Access Slots (MAS) where each MAS length is 256 [usec]. MAS slots are numbered from 0 to 255 and MAS slot 9 is the first slot. Several slot types are defined depending on how the MAS are utilized by the device or devices nearby.

Time is divided into superframes, as illustrated in FIG. 1. At the beginning of each superframe there is a "beacon phase 101" followed by a "data transmission phase 120".

Before communication can take place between wireless personal devices, each device must either create its own beacon group or join an existing beacon group. For each "beacon phase 101" (also known as a beacon period or BP), a dynamic number of consecutive MAS slots are utilized as beacon slots, where all the devices transmit their beacons 105. The start time of a superframe 100 is determined by the beginning of a beacon period 101 and is defined as a beacon period start time (BPST) and MAS slots are numbered relative to this starting time. When a device initiates a new beaconing group, it defines the superframe boundary at any timeslot that does not collide with other beaconing groups' timeslot reservations.

In the data phase two access mechanisms are possible. One access method is called "Distributed Reservation Protocol" (DRP). It foresees that devices can make a reservation for a certain period of the data phase. The reservation is negotiated between sender and receiver(s) of the planned transmission. This negotiation is either carried out by a dedicated signalling handshake, or implicitly by including the reservation information in the sender and receiver(s) beacons. Once the reservation is established, the reservation information must be included in the beacon of the sender as well as the receiver(s) in every superframe (and optionally also the beacons of neighboring devices of sender and receiver(s)), in which the reservation is still active. This is necessary in order to inform neighboring devices of sender and receiver(s) (and optionally also the neighbors' neighbors) about the existing reservation. No other device besides the sender(s) is allowed to access the medium at the beginning of a reserved period. In order to make efficient usage of unused reservation periods, two types of reservations are defined: soft and hard reservations. In a soft reservation period, other devices can access the medium after a certain idle time on the medium. In a hard reservation, other devices are only allowed to access the medium after the sender(s) and receiver(s) have signalled the end of their transmission(s) by a NAK-RTS/NAK-CTS signalling handshake.

The second possible access method in the MAC standard is similar to the Enhanced Distributed Coordination Function (EDCA) of IEEE 802.11e, which is based on Carrier Sense Multiple Access (CSMA) with back-off protocol. This random access method is only allowed in non-reserved parts of the data phase or in unused reservation periods. Reservations must be respected by all devices.

Beacons are used to signal reservations as well as for power saving purposes. Each device sends its own beacon in a fixed beacon slot. The device selects its slot among the unused slots of a reservation period after it has been turned on. In order to detect that two devices have selected the same beacon slot each device includes in its own beacon information about all other beacons that it has received. A device can detect that its beacon has eventually collided with another device's beacon by the fact that its beacon is not referenced in any beacon of the other devices. In this case the device must randomly select a different beacon slot in the next superframe. This protocol is called Beacon Collision Resolution Protocol (BCRP).

During a "hard" reservation no other device except the sender of the reservation is allowed to access the medium. It frequently happens that a sender no longer needs a previously reserved time or that the sender does not need all the reserved time. This may especially be the case for periodic reservations, which is the type of reservation carried out in the MBOA MAC. This unused time is lost for transmissions of other devices that are not allowed to access the medium during a hard reservation, even if the medium is idle. In order to avoid such wasted airtime, the current MAC draft standard foresees that the sender can announce that the sender makes available the remainder or the whole reserved period for transmissions of other devices. Devices around the sender that receive this announcement may access the medium during the remainder of the reserved period (and beyond if no other reservation is announced). However, the original reservation of the sender has not only been distributed by the sender but also has been distributed by the intended receiver(s) of the planned transmission, and eventually is also distributed by the neighbors of the sender and receiver(s). Thus, there might be devices outside the range of the sender, which have stored the reservation but do not receive the announcement that the reserved time is available, rsp. unused. In order to inform all devices of the availability of the reserved time, all devices, that had previously announced the reservation, now also must announce the availability of the reserved time. Devices that must repeat the announcement of the sender that the reservation is revoked are the intended receiver(s) of the planned transmission as well as neighbors of sender and receivers, in case they had also broadcast the reservation before.

The first announcement of the sender is expected, therefore, to be followed by a plurality of announcements of the receivers and eventually neighbors of sender and receivers. The probability of collision of these announcements on the shared medium is very high. This collision problem is solved through the protocol of the present invention.

In one protocol for NAK-RTS/CTS, the medium is freed by a NAK-RTS frame, followed by a NAK-CTS frame of the receivers of the planned (or shorter than planned) transmission. The order in which the receivers respond with a NAK-CTS frame is given by their device identifier (DEVID). This protocol only works if the devices that must respond to the NAK-RTS frame know about their respective DEVIDs and can therefore deduce when to send their NAK-CTS frame. However, given the Distributed Reservation Protocol (DRP) of MBOA, devices might not necessarily know which other devices have received the NAK-RTS.

Thus, a protocol is needed for signalling the end of a transmission that works even if DRP devices do not know which other devices have received the NAK -RTS.

The system and method of the present invention provide a protocol for a device to announce that a previously reserved time-period or time-slot is not (completely) used and is available, so that other devices can transmit during the unused time. The system and method of the present invention are especially intended for systems incorporating a distributed medium reservation protocol for use by the devices, i.e., those systems adhering to an MBOA distributed reservation protocol (DRP).

In a system with a shared medium and distributed reservation, a reservation is typically not only broadcast by the sender of the transmission that is planned during the reservation, but is also broadcast by the receiver(s) of the transmission, or even by neighboring devices of sender and receiver(s). This is why, in order to revoke a reservation, not only the sender but also the receiver(s) and eventually neighbors must broadcast a message that the reservation is not (fully) used and can be re-used by other devices. A problem arises when the announcements of the receivers and neighbors collide on the medium. In order to avoid this problem, in a preferred embodiment of the present invention, the sender includes a list of receivers and eventually neighbors in its own announcement. The devices included in the list then repeat this announcement in the order in which they are mentioned in the list.

The system and method of the present invention can be used in all devices that use distributed reservation protocols, and is particularly useful for UWB MAC.

In the following description, by way of explanation, not limitation, specific details are set forth such as the particular architecture, interfaces, techniques, etc., in order to provide a thorough understanding of the present invention. However, it will be apparent to those skilled in the art that the present invention may be practiced in other embodiments that depart from these specific details.

Figure 1:
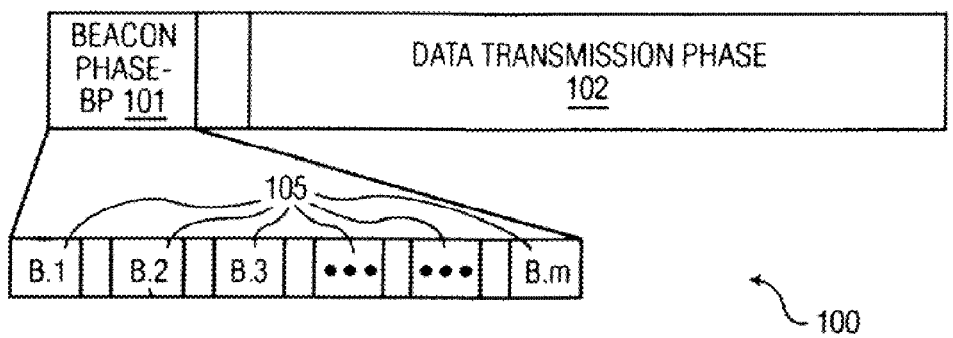
FIG. 1 illustrates a superframe layout for a MAC protocol.
Figure 2A:
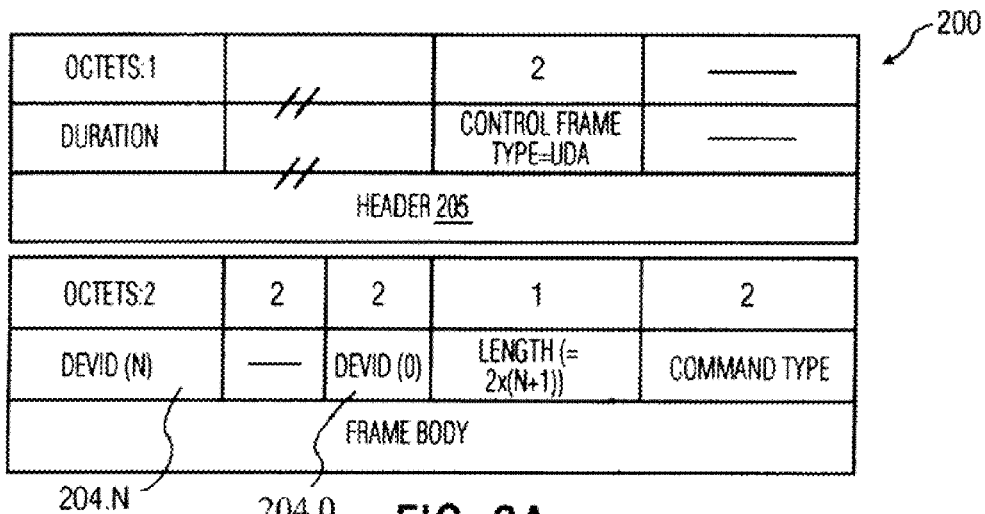
FIG. 2A illustrates the format of an Unused Distributed-Reservation Announcement control frame, according to a preferred embodiment of the present invention.

The present invention provides a system and method of freeing unused time left over from a previously reserved time period by providing a DRP sender an "Unused DRP Announcement" broadcast control/command frame 200 to announce over the medium unused time of a reservation. The format of the "Unused DRP Announcement" broadcast control frame 200 is illustrated in FIG. 2A. The Announcement 200 includes at least one DEVID 204. The Unused DRP Announcement control frame 200 is a broadcast frame used to explicitly release Hard DRPs. The MAC header settings for UDA control frame are set and interpreted as described in Table 1.

Figure 2B:
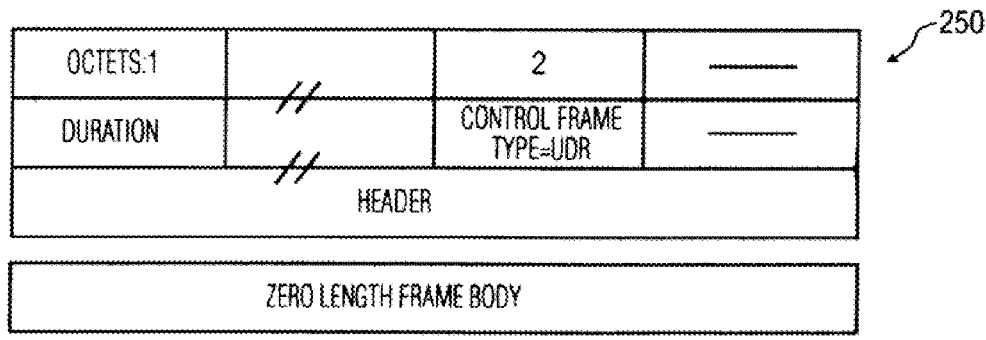
FIG. 2B illustrates a format of an Unused Distributed-Reservation Response control frame, according to a preferred embodiment of the present invention.

The Unused DRP Announcement control frame (UDA) 200 comprises a header and a frame body, the latter including a list of devices that should respond with an Unused DRP Response control/command frame (UDR) 250, as illustrated in FIG. 2B. In the UDA control frame 200 the sender includes a list of one or more receivers/neighbors 204.0-204.N that should respond to this announcement. The order in which the DEVIDs of the receivers/neighbors are mentioned in the list is the order in which the receivers should respond. The Announcement 200 is sent only by the DRP sender when the DRP sender has calculated that there is enough time to receive all responses during the remaining DRP time. Upon reception of the "Unused DRP Announcement" control frame (UDA) 200, a device checks whether it is mentioned in the list of receivers/neighbors 204.0-204.N. If a receiving device is mentioned in the list 204.0-204.N, the receiving device responds with an "Unused DRP Response" control frame (UDR) 250. The Unused DRP Response control frame (UDR) 250 is a broadcast frame used to respond to UDAs and explicitly release hard DRPs. The Unused DRP Response control frame (UDR) 250 is a zero length payload frame.

That is, if there is remaining time unused during a Hard DRP reservation, the sending device announces the end of the reservation period by a UDA control frame 200. The sender includes a list of the device(s) 204.0-204.N in the UDA control frame 200 that should respond to this announcement. This list of one or more devices 204.0-204.N consists of those devices that have previously included the corresponding DRP information in their beacon. The order in which the IDs of the devices are mentioned in the list 204.0-204.N is the order in which they should respond with a UDR control frame 250, whereby, devices around the sender as well as the devices in the list 204.0-204.N are informed about the early end of the hard reservation period.

Upon receipt of a UDA control frame 200, a device must check whether its DEVID is included in the device list 204.0-204.N of the, UDA control frame 200. If the receiver's DEVID is included in the list it must respond to the UDA control frame 200 with a UDR control frame 250 after a deterministic delay. This delay is computed based on transceiver turn-around time plus a time that depends on the position M of the receiver in the UDA's list. In a preferred embodiment, this delay is calculated as:

Time_To_Send_Response=SIFS+(Position_In_List_
in_UDA)*(UDR_Control_Frame_Duration+
SIFS), where:
(1) Time_To_Send_Response is measured from the end of reception of the UDA control frame 200; and
(2) Position_In_List has the values (0, . . . ,N).

UDA and UDR control frames 200, 250 release the time between the end of the last UDR control frame 250, as indicated by the Duration value in the header of UDA 200 and UDR 250 control frames, and the end of the remaining contiguous DRP slots of the same DRP. Slots pertaining to the same DRP that are not consecutive, either in the same superframe or following superframes, are not released.

The Duration value in the UDA control frame 200 covers the UDA control frame 200 as well as all expected UDR control frames 250. The Duration value in the UDR control frame 250 is set to the Duration value in the UDA control frame 200 minus the time between the end of the UDA control frame 200 and the end of the respective UDR control frame 250. This value is given by:

UDR_Control_Frame_Duration=UDA_Control_Frame_Duration−
(SIFS+(Position_In_List)*(UDR_Control_
Frame_Duration+SIFS))−UDR_Control_Frame_
Duration.

For example, for a protocol like MBOA or IEEE 802.11, the time to send a response or UDR is calculated as follows:

Time_To_Send_Response=SIFS+(Position_In_List)*
(Response_Frame_Length+SIFS), where:
(1) Time_To_Send_Response is measured from the end of reception of the Unused DRP Request control/command frame; and
(2) Position_In_List has the values (0 . . . N).

In a preferred embodiment, the "Unused DRP Response" control frame 250 is sent as a broadcast frame. This protocol avoids collisions of Response frames on the medium.

Figure 3:
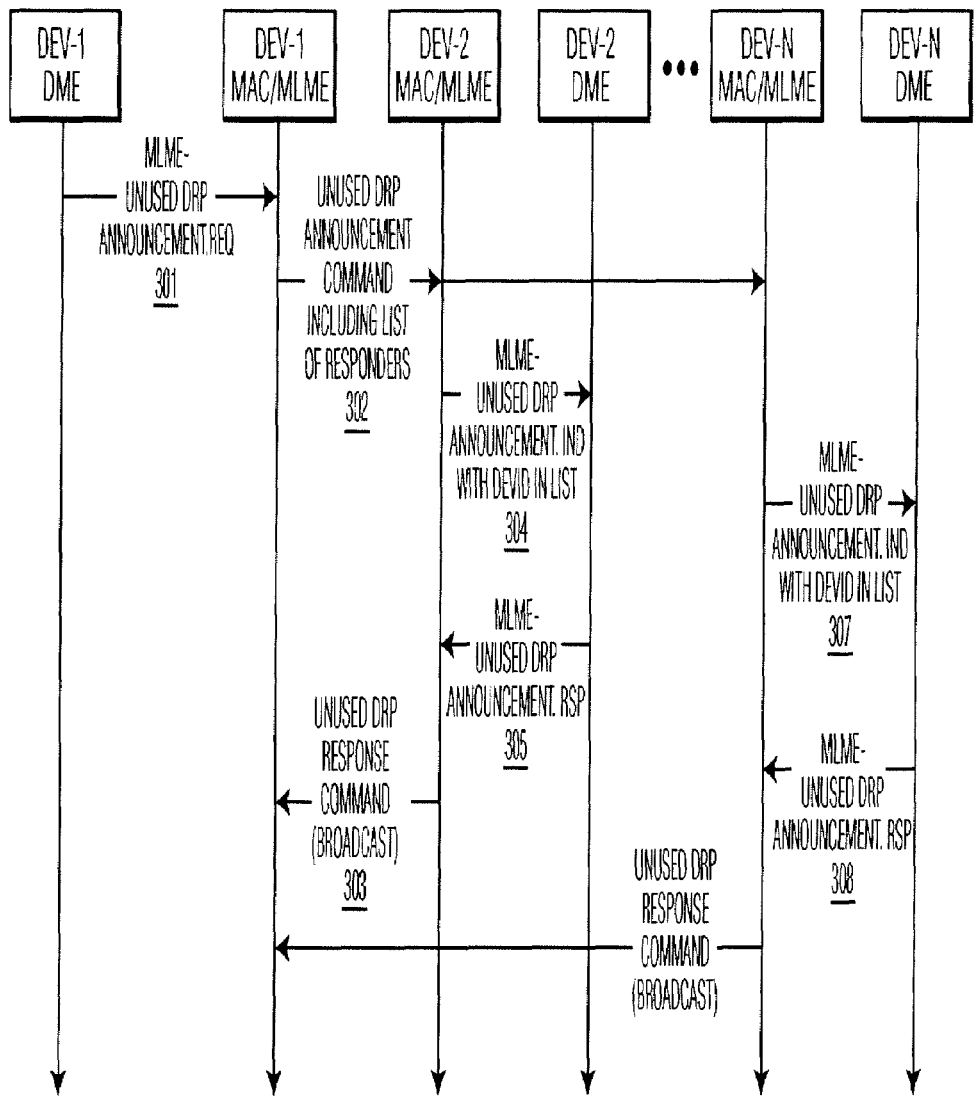
FIG. 3 illustrates a message exchange to announce unused reservation time, according to an embodiment of the present invention; and, FIG. 4 illustrates a simplified block diagram of a wireless device modified according to the present invention to release unused DRP reservation time in an ad-hoc wireless network.

A preferred message exchange is illustrated in FIG. 3. At 301, the sending device first determines that there is unused time and enough time to broadcast an Announcement and receive responses, as indicated in the "Time_To_Send_Response" calculation above. If there is sufficient time, then the sender sends an Unused DRP Announcement at 302 including a list of responders. Receivers, i=1-N, of the Announcement control frame 200 set Unused DRP Announcement.rsp$_i$ at 305 to broadcast an "Unused DRP Response" control frame 250 at 303 as well as set Unused DRP Announcement.ind$_i$ at 304 using DEVID in the list of the Announcement control frame 200. "Steps 307 and 308 perform the same functions as steps 304 and 305, respectively, for other devices within the network."

Figure 4:
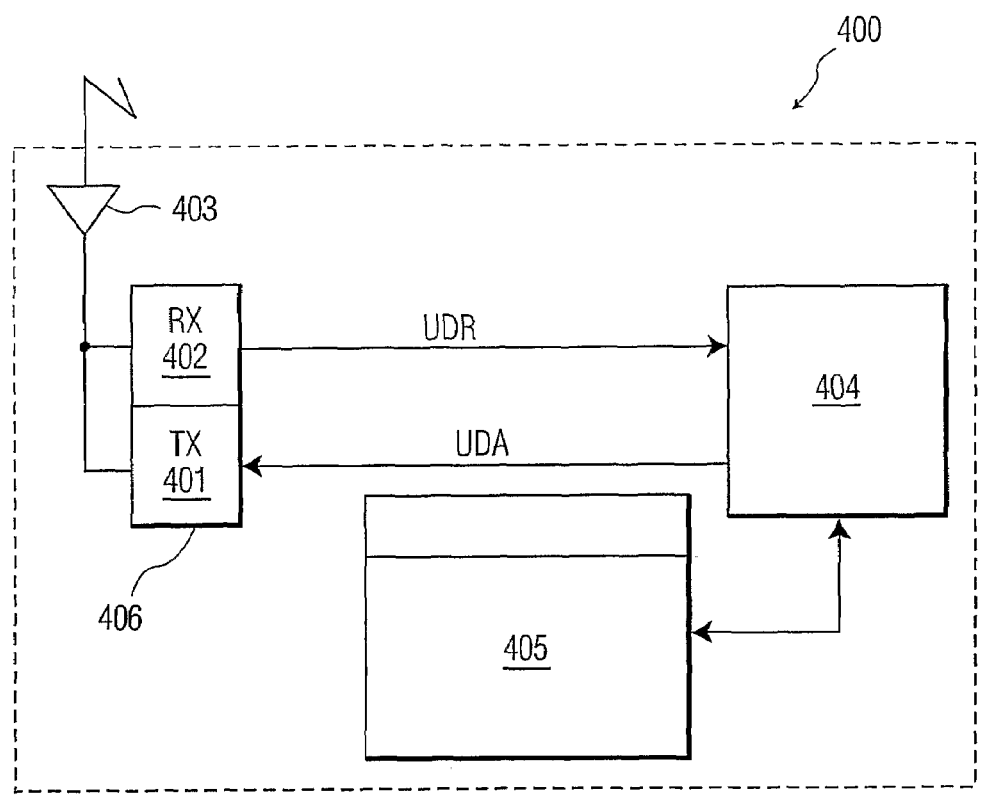

Referring now to FIG. 4, a device 400 modified according to the present invention comprises an antenna 403 for transmitting and receiving UDA and UDR control frames. The antenna 403 is operatively coupled to a transceiver 406 including transmitter 401 and receiver 402. A distributed reservation management module 404 determines when there is leftover time in a reservation and whether or not there is sufficient time leftover to both transmit a UDA control frame 200 and receive all anticipated UDR control frame 250 responses thereto, i.e., by calculating UDA_Control_Frame_Duration=SIFS+Length_of_
UDA+N*(Length_of_UDR+SIFS).

The invention also may be applied for CSMA/CA systems to free unused time that had previously been reserved by an RTS or similar packet.

While the preferred embodiments of the present invention have been illustrated and described, it will be understood by those skilled in the art that various changes and modifications may be made, and equivalents may be substituted for elements thereof without departing from the true scope of the present invention. For example, In addition, many modifications may be made to adapt to a particular situation, such as format changes of the control frames and elements thereof, and the teaching of the present invention can be adapted in ways that are equivalent without departing from its central scope. Therefore it is intended that the present invention not be limited to the particular embodiment disclosed as the best mode contemplated for carrying out the present invention, but that the present invention include all embodiments falling within the scope of the appended claims.

What is claimed is:

1. A method for freeing an unused reserved time of a reservation of transmission time of a distributed protocol for wireless networks, comprising the steps of:
   determining by a sender of a transmission that there is unused transmission time left in the reservation;
   when it is determined that there is unused time left, sending by the sender an announcement of the unused time, said announcement including a list of member devices that have previously acknowledged the reservation; and
   broadcasting a response by each member of the list that receives the sent message after a time that depends partly on the position M of the member in the list.

2. The method of claim 1, wherein the determining step further comprises the step of determining that there is unused time left only after performing the step of determining there is enough unused time left in the reservation to send the announcement and receive a response from every device that had previously acknowledged the reservation.

3. The method of claim 1, wherein the sending step further comprises the step of sending an announcement in the form of an unused announcement control/command frame comprising:
   a frame header including a duration of the unused time.

4. The method of claim 1, wherein the broadcasting step further comprises the step of broadcasting an unused response control/command frame comprising:
   a frame header including a duration of the response frame set to the time between the end of the announcement control frame and the end of the response control frame.

5. The method of claim 1, wherein the unused transmission time left is one of all of the reserved time and part of the reserved time.

6. The method of claim 1, wherein the broadcasting step further comprises the step of computing the time after which to send a response as a transceiver turn-around time plus a time that depends on the position M of the member in the list.

7. The method of claim 6, wherein a response comprises an unused reservation response control frame and the time that depends on the position M is M times the sum of a guard-time and a length of an unused reservation response control frame.

8. The method of claim 7, wherein:
   the transceiver turn-around time is a short inter-frame space (SIFS); and
   the guard-time is the short inter-frame space (SIFS).

9. The method of claim 8, wherein the sending step further comprises the step of sending an unused time announcement control/command frame comprising:
   a frame header including a duration of the unused time.

10. The method of claim 9, wherein the broadcasting step further comprises the step of broadcasting an unused response control/command frame comprising:

a frame header including a duration of the response frame set to the time between the end of the announcement control frame and the end of the response control frame; and a zero length frame body.

11. The method of claim 10, wherein the unused transmission time left is one of all of the reserved time and part of the reserved time.

12. A system that frees unused reserved time of a reservation reserved by a wireless device using a distributed reservation protocol in a wireless network, comprising:

a transceiver to send and receive at least one of an unused time announcement control frame and an unused time response control frame related to at least one distributed reservation;

a distributed reservation management module operatively coupled to the transceiver to-
  (1) when there is unused time in the at least one distributed reservation, to
    i. send an announcement control frame including an acknowledger device list of devices that previously acknowledged the reservation, and
    ii. receive unused response control frames broadcast by members of the list that received the announcement control frame;
  (2) receive an announcement control frame including a list of devices and when the device appears in the received list, broadcast an unused response control frame after a time that depends partly on the position M of the device in the received list.

13. The system of claim 12, wherein:
the apparatus further comprises a memory containing the distributed reservation parameters and the acknowledger device list of devices that previously acknowledged the reservation and operatively coupled to the management module; and
the management module is further configured to store and retrieve the parameters and acknowledger device list for the reservation in the memory and to-
  i. determine if there is unused time in a reservation and when there is unused time make entries therefrom in the announcement control frame, and
  ii. determine if the device is a member of a list in a received announcement control frame and make entries therefrom in the response control frame.

14. The system of claim 13, wherein the management module is further configured to determine that there is unused time in a reservation only if there is enough unused time in the reservation to send the announcement and receive a response from every device that had previously acknowledged the reservation.

15. The system of claim 14, wherein the management module is further configured to compute the time after which to send a response as a transceiver turn-around time plus a time that depends on the position M of the member in the received list.

16. The system of claim 15, wherein a response comprises an unused reservation response control frame and the time that depends on the position M is M times the sum of a guard-time and a length of an unused reservation response control frame.

17. The system of claim 16, wherein:
the transceiver turn-around time is a short inter-frame space (SIFS); and
he guard-time is the short inter-frame space (SIFS).

18. The system of claim 17, wherein the unused announcement control frame comprises:
a frame header including a duration of the unused time.

19. The system of claim 18, wherein the unused response control frame comprises:
a frame header including a duration of the response frame set to the time between the end of the announcement control frame and the end of the response control frame; and
a zero length frame body.

20. The system of claim 19, wherein the unused time in the reservation is one of all of the reserved time and part of the reserved time.

21. A wireless device that frees unused contiguous reserved time of a reservation made by the wireless device using a distributed reservation protocol in a wireless network, comprising:

a transceiver including a transmitter component to send an unused time announcement control frame and a receiver component to receive an unused time response control frame related to at least one distributed reservation made by the wireless device;

a distributed reservation management module operatively coupled to the transceiver such that when there is unused time in the at least one distributed reservation, to
  i. send an announcement control frame including an acknowledger device list of devices that previously acknowledged the reservation, and
  ii. receive unused response control frames broadcast by members of the acknowledger device list that received the announcement control frame;
wherein, the wireless device frees the time between an end of a last unused response control frame of said broadcast unused response control frames and an end of the unused contiguous time of the reservation.

* * * * *